(12) United States Patent
Hildenbrand et al.

(10) Patent No.: US 6,367,677 B1
(45) Date of Patent: Apr. 9, 2002

(54) WAVE SOLDER APPARATUS AND METHOD

(75) Inventors: Chris Lee Hildenbrand, Greensburg, IN (US); Nikolaos Thomas Kostopoulos, Cincinnati, OH (US); Ernie Gipson, Greensburg, IN (US); Matthew T. Rosemeyer, Brookville, IN (US); Frank W. Cleary, Guilford, IN (US); Michael Joseph Gosmeyer, Batesville, IN (US); Timothy Kieffer, Arbor, IN (US); Ronald A. Poggeman, Milan, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/672,339

(22) Filed: Sep. 28, 2000

Related U.S. Application Data

(60) Provisional application No. 60/156,481, filed on Sep. 28, 1999.

(51) Int. Cl.[7] .................... B23Q 15/22; B23K 1/08; B23K 31/02
(52) U.S. Cl. ............... 228/9; 228/37; 228/43
(58) Field of Search ................. 228/102, 256, 228/260, 8, 9, 33, 37, 43

(56) References Cited

U.S. PATENT DOCUMENTS

| | | | |
|---|---|---|---|
| 3,765,591 A | 10/1973 | Cook | |
| 3,773,242 A | 11/1973 | Fitzsimmons | |
| 4,139,143 A | 2/1979 | Gumprecht | |
| 4,632,291 A | 12/1986 | Rahn et al. | |
| 4,683,789 A | * 8/1987 | Lopez | |
| 4,685,605 A | * 8/1987 | Spigarelli et al. | |
| 4,807,794 A | * 2/1989 | Hess | |
| 5,121,874 A | * 6/1992 | Deambrosio et al. | |
| 5,148,961 A | 9/1992 | Humbert et al. | |
| 5,176,307 A | 1/1993 | Hagerty et al. | |
| 5,176,312 A | * 1/1993 | Lowenthal | |
| 5,192,582 A | * 3/1993 | Liedke et al. | |
| 5,230,460 A | 7/1993 | Deamborsio et al. | |
| 5,240,746 A | * 8/1993 | O'Connell Litteral | |
| 5,292,055 A | * 3/1994 | Gileta | |
| 5,297,724 A | 3/1994 | Mehta et al. | |
| 5,411,200 A | 5/1995 | Conners et al. | |
| 5,678,752 A | 10/1997 | Kaminsky et al. | |
| 5,720,426 A | 2/1998 | Fothen | |
| 5,772,101 A | 6/1998 | Nishimura et al. | |
| 5,775,568 A | 7/1998 | Asla et al. | |
| 5,813,595 A | 9/1998 | Albrecht et al. | |
| 5,820,013 A | 10/1998 | Ortiz | |
| 6,186,388 B1 | * 2/2001 | Sadler et al. | |

* cited by examiner

Primary Examiner—Tom Dunn
Assistant Examiner—Kiley Stoner
(74) Attorney, Agent, or Firm—Bose McKinney & Evans LLP

(57) ABSTRACT

A wave soldering apparatus includes a frame having a first end and wave solder equipment supported with respect to the frame. The wave solder equipment is configured to apply solder to a circuit board. A circuit board transporter is supported with respect to the frame, and is configured to receive a circuit board adjacent the first end of the frame, to move the circuit board away from the first end of the frame and over the wave solder equipment which applies solder to the circuit board, and to return the circuit board for retrieval adjacent the first end of the frame.

37 Claims, 7 Drawing Sheets

WAVE SOLDER APPARATUS AND METHOD

This application claims the benefit of U.S. Provisional Application No. 60/156,481, filed Sep. 28, 1999, the disclosure of which is incorporated herein by reference.

BACKGROUND AND SUMMARY OF THE INVENTION

The present invention relates to a wave solder apparatus for soldering electrical components to printed circuit boards. Various devices are known for producing a molten solder wave and passing a printed circuit board through the molten solder wave to solder electrical components to the printed circuit board. Illustratively, such wave solder devices include a flux station, a preheating station, and a soldering station. See, for example, U.S. Pat. Nos. 4,139,143; 4,632,291; 5,176,307; 5,297,724; and 5,678,752, the disclosures of which are incorporated herein by reference.

In accordance with the invention, a wave solder apparatus is provided. The wave solder apparatus includes a frame having a first end, wave solder equipment supported with respect to the frame, the wave solder equipment being configured to apply solder to a circuit board, and a circuit board transporter supported with respect to the frame, the circuit board transporter being configured to receive a circuit board adjacent the first end of the frame, to move the circuit board away from the first end of the frame and over the wave solder equipment which applies solder to the circuit board, and to return the circuit board for retrieval adjacent the first end of the frame.

Also in accordance with the invention, a wave solder apparatus includes a carriage configured to receive and support a printed circuit board, a first conveyor configured to convey the carriage along a first conveyor path, a second conveyor configured to convey the carriage along a second conveyor path, a preheat station proximately spaced from the first conveyor path, the preheat station configured to heat the printed circuit board, a soldering station configured to form a solder wave, the soldering station proximately spaced from the first conveyor path and wherein the carriage supporting the printed circuit board traverses over the solder wave and the solder wave communicates solder onto the printed circuit board, a transport configured to receive the carriage from the first conveyor and transport the carriage to the second conveyor, and a controller coupled to the first conveyor, preheat station, soldering station, transport, and second conveyor, the controller configured to cooperatively operate the first conveyor, preheat station, soldering station, transport, and second conveyor to wave solder the printed circuit board.

Further in accordance with the invention, a wave solder apparatus includes a conveyor configured to receive and move a printed circuit board along a conveyor path, a soldering station configured to form a solder wave, the soldering station proximately spaced from the conveyor path wherein the printed circuit board traverses the solder wave and the solder wave applies solder to the printed circuit board, and a controller coupled to the conveyor and the soldering station, the controller configured to cooperatively operate the conveyor and soldering station wherein the soldering station,is activated and forms a solder wave when the printed circuit board traverses the soldering station in a first direction, and the soldering station is deactivated when the printed circuit board is moved in a second direction, the second direction opposite the first direction.

Also in accordance with the invention, a printed circuit board manufacturing apparatus is provided. The printed circuit board manufacturing apparatus includes a carriage configured to receive and support a printed circuit board, an identifier attached to the carriage, the identifier configurable to identify the printed circuit board, and an identifier sensor configured to read the identifier attached to the carriage and provide an identifier signal.

A method of wave soldering a printed circuit board in accordance with the invention is also disclosed. The method includes the steps of moving a printed circuit board along a first linear path in a first direction, holding the printed circuit board stationary in the first linear path while heating the printed circuit board for a programmed time, and moving the printed circuit board through a solder wave.

A further method of wave solder a printed circuit board in accordance with the invention is also disclosed. The method includes the steps of moving a printed circuit board along a first linear path in a first direction, preheating the printed circuit board for a programmed time, moving the printed circuit board through a solder wave, transporting the printed circuit board from the first linear path to a second linear path, and moving the printed circuit board along the second linear path in a second direction, the second direction opposite the first direction.

A still further method of wave solder a printed circuit board in accordance with the invention is also disclosed. The method includes the steps of loading the circuit board onto a wave solder apparatus at a first end of the wave solder apparatus, moving the circuit board along a first linear path away from the first end of the wave solder apparatus toward a second end of the wave solder apparatus, applying solder to the circuit board, and returning the circuit board back to the first end of the wave solder apparatus.

BRIEF DESCRIPTION OF THE DRAWINGS

A detailed description particularly refers to the accompanying figures in which.

DETAILED DESCRIPTION OF THE DRAWINGS

Figure 1:
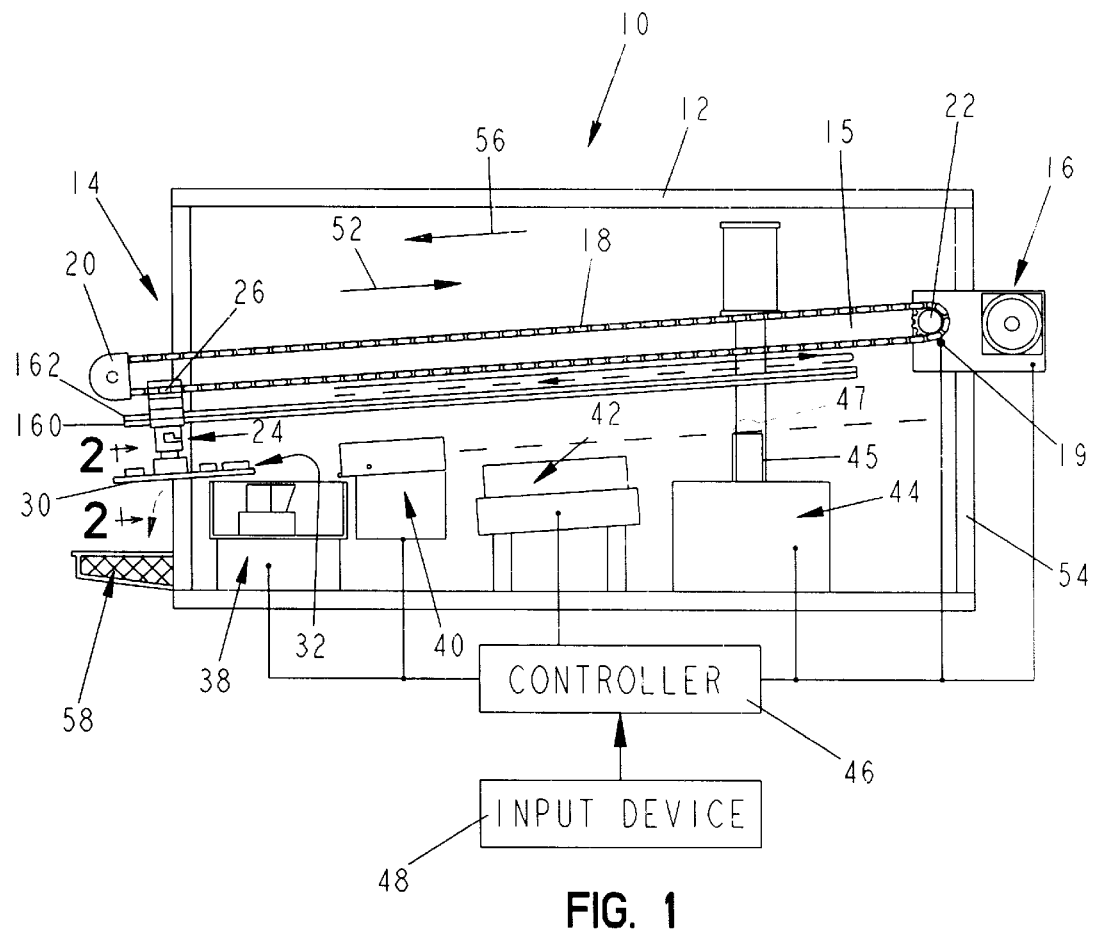
FIG. 1 is a diagrammatical side view of a first embodiment of the present invention.
Figure 2:
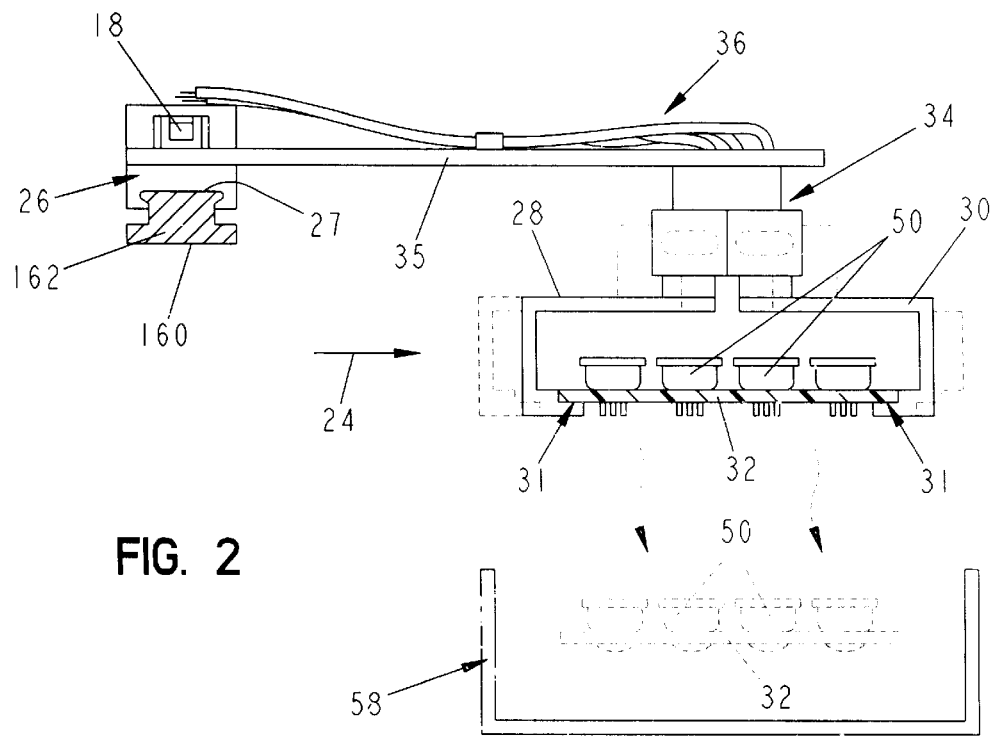
FIG. 2 is a partial sectional view of a circuit board gripping apparatus of the FIG. 1 embodiment.

Referring now to the drawings, FIG. 1 illustrates a wave solder apparatus 10 having a frame or enclosure 12 with an opening 14 at a first end. The wave solder apparatus 10 illustratively includes a circuit board transporter. In the exemplary embodiment, the circuit board transporter includes conveyor 15 comprising a drive motor 16 configured to move a chain 18 over first and second spaced apart sprockets 20 and 22. A carriage 24 is coupled to chain 18 as shown in FIG. 1. Carriage 24 includes a coupler 26 coupled to chain 18. Carriage 24 also includes a pair of spaced-apart gripping arms 28 and 30 configured to support a printed circuit board 32 therebetween as best shown in FIG. 2. The coupler 26 includes a channel 27 which engages railhead 162 of rail 160 so that the coupler 26 is slidably engaged on rail 160 via railhead 162. Gripping arms 28 and 30 are supported by an adjustment mechanism 34 which is connected to the coupler 26 by a plate 35. Adjustment mechanism 34 is configured to move gripping arms 28 and 30 from the solid line position shown in FIG. 2 to a dotted line position shown in FIG. 2 to release the printed circuit board 32 from the gripping arms 28, 30. Gripping arms 28 and 30 include extensions 31 to receive printed circuit board 32. Control lines 36 are used to actuate the adjustment mechanism 34 to control movement of the gripping arms 28 and 30. Illustratively, electrical, pneumatic or hydraulic controls may be used to move the gripping arms 28 and 30. Of course, one of ordinary skill in the art will appreciate that other control mechanisms may be used to control movement of gripping arms 28 and 30, such as a cam actuator, for example.

Wave solder apparatus 10 further includes a flux station 38, a nitrogen knife station 40, a preheating station 42, and a wave soldering station 44. Operation of each of these components, including the drive motor 16, is controlled by an electrical controller 46. An input device 48 is used to provide user control inputs to the controller 46. An operator provides the printed circuit board type identifier as an input parameter. From this parameter, the controller determines the appropriate carriage speed, preheat dwell time, and solder wave control inputs. The parameters are programmed by the user beforehand, so that when the user enters the printed circuit board type, the controller automatically selects the parameters.

In operation, the printed circuit board 32 having electrical components 50 thereon is loaded into the carriage 24 near the opening 14. Typically, one or more circuit boards 32 is loaded on to the carriage 24. Controller 46 then activates the flux station 38 and the nitrogen knife station 40 and turns on the preheater 42 which is illustratively an infrared (IR) heating element. Controller 46 then activates motor 16 to move the carriage 24 over the flux station 38 and the nitrogen knife station 40. Motor 16 engages sprocket 22, which engages chain 18 and sprocket 20. Carriage 24, coupled to chain 18 by coupler 26, slides along railhead 162 on channel 27. Flux station 38 and nitrogen knife station 40 are used to clean the printed circuit board 32 prior to soldering.

Next, the controller 46 controls the motor 16 to stop the carriage 24 over the preheater station 42 for a predetermined amount of time to preheat the printed circuit board 32 prior to soldering. Since the controller 46 stops the carriage 24 over the preheater 42, a smaller preheating device may be used compared to a continuous flow device. The length of time that the board 32 remains over heater 42 is adjusted based on the characteristics of the particular board 32 being processed. This time parameter is controlled by the controller 46 based on printed circuit board type identifier input by the user.

Next, controller 46 activates the wave solder unit 44 and causes motor 16 to continue to move the carriage 24 in the direction of arrow 52 over the wave solder unit 44. Wave solder unit 44, when activated, creates a wave of molten solder 47 extending above pot 45. As the carriage 24 passes over the wave solder unit 44, the underside of printed circuit board 32 is brought into contact with the solder wave 47 and solder is communicated onto the underside of printed circuit board 32. After the entire carriage 24 passes over the wave solder unit 44 and is situated adjacent end wall 54 of the enclosure 12, controller 46 shuts off the wave solder unit 44, and the solder wave 47 is removed.

Controller 46 then moves the carriage 24 back along the same travel path in the opposite direction illustrated by arrow 56 to the same point as the starting point as illustrated in FIG. 1. Because the wave solder unit 44 has been shut off, no solder wave 47 is present to make contact with the underside of circuit board 32. Thus, the same conveyor path is used to move the printed circuit board 32 over the solder wave 47 and return the printed circuit board 32 after soldering. Illustratively, the carriage 24 travels along a conveyor path at about a 7 degree angle which is the optimum angle for such soldering processes. Of course, as one of ordinary skill in the art will readily appreciate, the angular range of the conveyor path may vary, and the angle of 7 degrees, while preferred, is not required to practice the disclosed exemplary embodiment.

Because the same conveyor path is used to move the printed circuit board 32 over the solder wave and return the printed circuit board 32 after soldering, an operator loads the printed circuit boards 32 onto the carriage 24 and retrieves the soldered printed circuit boards 32 at the same location relative to the wave solder apparatus 10. In other words, the carriage 24 moves through the wave solder apparatus 10 to solder the circuit board 32 and then moves back along the same linear path to its starting point after the circuit board 32 is soldered.

Thus, the wave solder apparatus 10 readily supports "just in time" inventory requirements. Rather than implementing a continuous flow wave soldering technique, in which a printed circuit board 32 traverses a wave soldering apparatus from front to back, the disclosed exemplary embodiment provides a smaller, more compact wave soldering apparatus 10 which is amenable to soldering a single printed circuit board 32. Of course, one of ordinary skill in the art will appreciate that the disclosed exemplary embodiment may also be used to solder large batches of printed circuit boards 32.

Controller 46 selectively starts, stops and controls the progress of the carriage 24 over the flux station 38, nitrogen knife station 40, preheater station 42, and wave solder unit 44 by one of several methods. A first method includes moving the carriage 24 at a predefined speed so that the relative position of the carriage is always known. Another method includes monitoring the progress of the carriage 24 by sensors placed along the rail 160, or by sensors placed near the flux station 38, nitrogen knife station 40, preheater station 42, and wave solder unit 44. In the disclosed exemplary embodiment, controller 46 monitors carriage 24 progress by use of a proximity sensor 19 juxtaposed to sprocket 22. Proximity sensor 19 monitors the sprocket 22 rotation which is correlated by controller 46 to the carriage 24 progress.

Once the soldered board 32 returns to its starting position, the controller 46 opens the first and second gripping arms 28 and 30 so that the soldered printed circuit board 32 falls into a discharge section 58, as shown in FIG. 2. Controller 46 then closes the first and second gripping arms 28 and 30 so that the operator may load the next printed circuit boards 32 onto the carriage 24.

After each printed circuit board 32 is soldered, the controller 46 increases a cycle count. When the cycle count equals 10, the controller resets the cycle count to 0 and activates a flux pump in flux station 38. Because flux in flux station 38 is used on each printed circuit board 32, the amount of flux will diminish over time. Activating a flux pump in flux station 38 every ten cycles ensures that an adequate amount of flux is available each time a printed circuit board 32 is moved over flux station 38.

Figure 4:
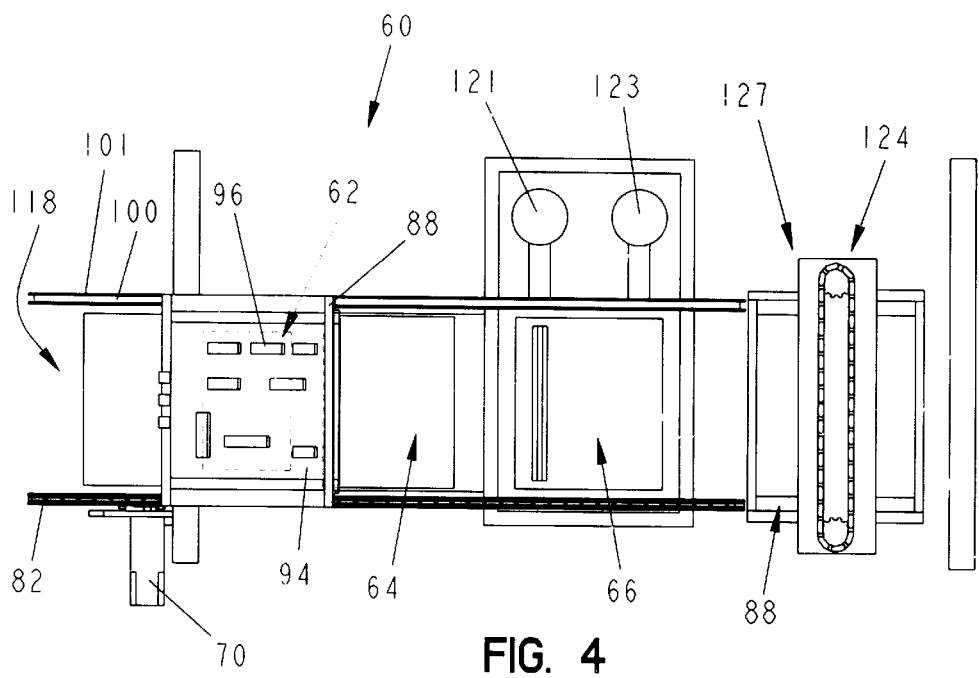
FIG. 4 is a top view of the apparatus of FIG. 3.
Figure 5:
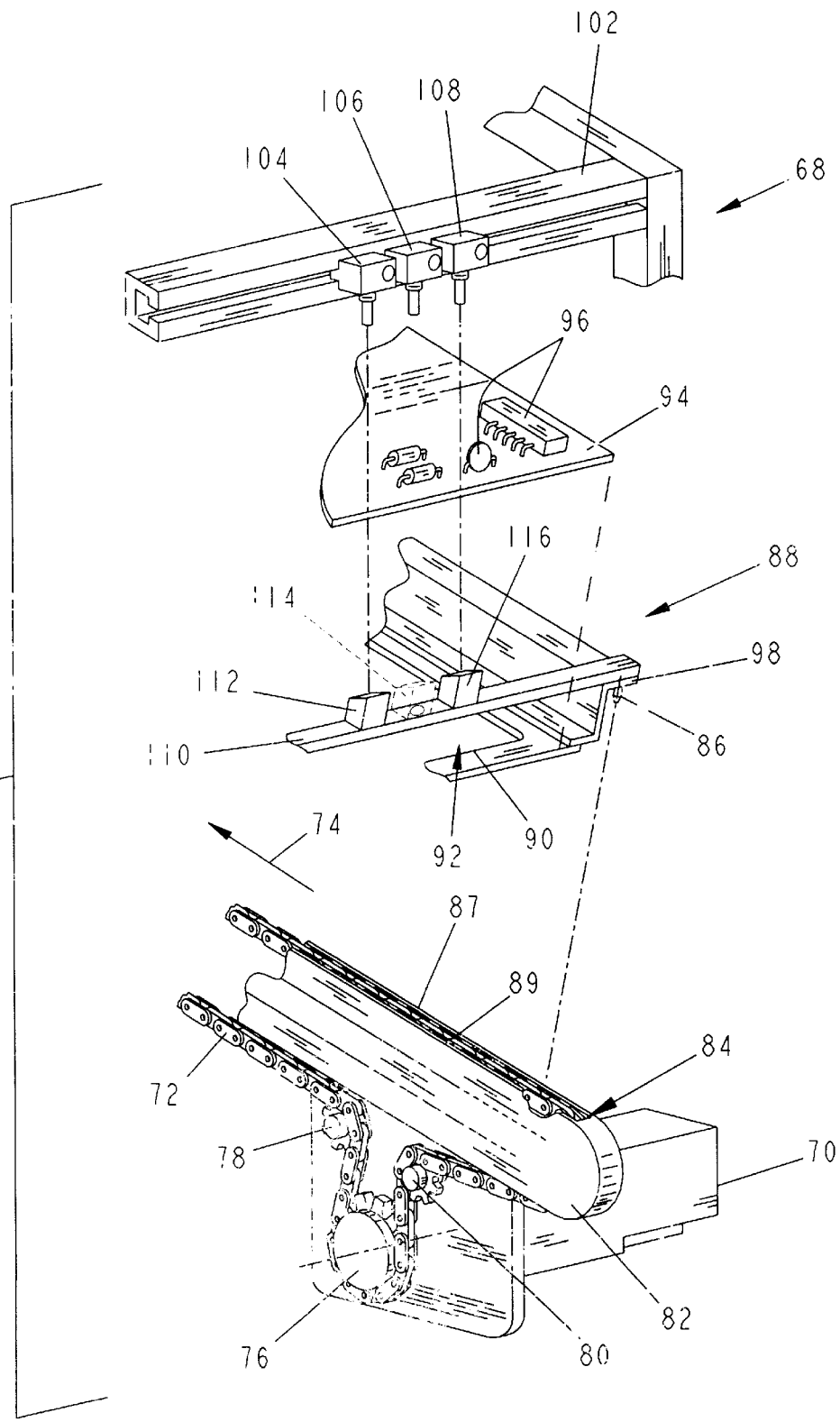
FIG. 5 is an exploded perspective view of a portion of the apparatus of FIGS. 3 and 4 illustrating a carriage for receiving the printed circuit board and a plurality of switches coupled to a controller for identifying a particular type of circuit board located within the carriage so that the controller controls the wave solder apparatus based upon the particular type of circuit board.

Another embodiment of the present invention is illustrated in FIGS. 3–7. As shown in FIG. 4, a wave solder apparatus 60 includes a flux station 62, a nitrogen knife 63, a heater 64, and a soldering station 66 all coupled to a base frame 68. The wave solder apparatus 60 illustratively includes a circuit board transporter. In the exemplary embodiment, the circuit board transporter includes a first conveyor 71. First conveyor 71 includes drive motor 70 and chain 72. Drive motor 70 is configured to move chain 72. An upper portion of the chain 72 travels in the direction of arrow 74 in FIG. 3. As shown in FIG. 5, motor 70 drives a sprocket 76 which rotates the chain 72. Chain 72 also passes over to idler sprockets 78 and 80 shown in FIG. 5.

A chain guard 82 surrounds the chain 72. Chain guard 82 includes a top opening 84 which is configured to receive a pin 86 located on a carriage 88. Top opening 84 extends longitudinally along the top of chain guard 82.

Carriage 88 includes a frame 90 configured to define an open central region 92. Frame 90 supports a printed circuit board 94 having a plurality of electrical components 96 thereon so that most of the printed circuit board 94 is situated over the open portion 92. Carriage 88 also includes opposite side flanges 98 which rest upon the chain guard 82 surfaces 87 and 89, and upon a guide member 100 spaced apart from the chain guard 82 as shown in FIG. 4. Guide member 100 includes a groove 101 that receives another pin 86 that is located on the other side of carriage 88.

Frame 68 includes an upper cross member 102 having a plurality of switches 104, 106, 108 mounted thereon. It is understood that any number of switches 104, 106, 108 may be used in accordance with the present invention. The carriage 88 includes a cross bar 110 which has actuator portions 112, 114, and 116 extending upwardly therefrom. Actuator portions 112, 114, and 116 correspond to switches 104, 106 and 108.

Carriage 88 may be uniquely configured to receive a unique printed circuit board 94, or may be universally configured to receive one of a plurality of printed circuit boards 94. A universal configuration can be implemented by an adjustable frame 90 which can be adjusted to receive specific printed circuit board 94 geometries by conforming to the printed circuit board 94. Actuator portions 112, 114 and 116 are included in both carriage 88 embodiments.

Figure 3:
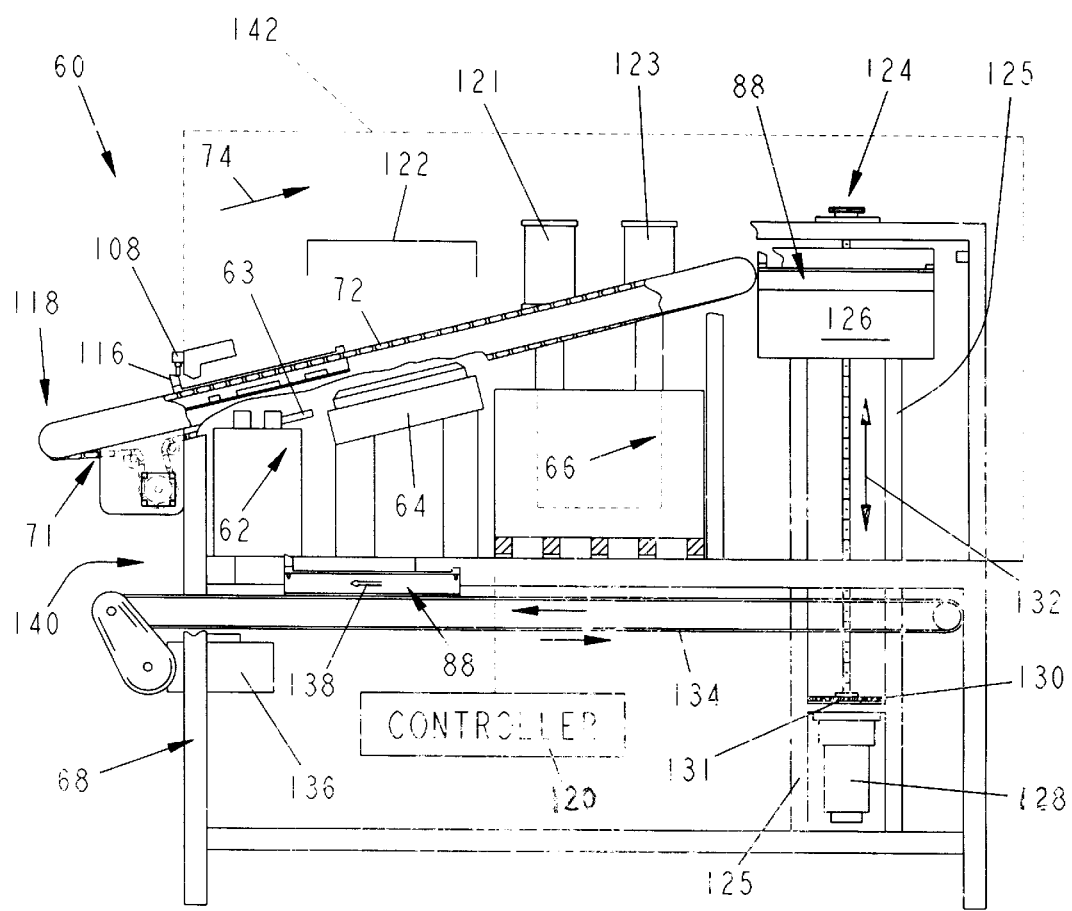
FIG. 3 is a side elevation view of another embodiment of a wave solder apparatus of the present invention.

In operation, carriage 88 is loaded onto the wave solder apparatus 60 at inlet portion 118 shown in FIGS. 3 and 4. Motor 70 is actuated to move the carriage 88 in the direction of arrow 74. Motor 70 engages sprocket 76, which, in turn, engages chain 72. Likewise, chain 72 engages pin 86 on carriage 88. As the carriage 88 moves past the cross member 102, the switches 104, 106 and 108 are engaged by the actuators 112, 114, 116. A different configuration of actuators 112, 114, and 116 is provided on the carriage 88 depending upon the particular type of circuit board 94 loaded into the carriage 88. The controller 120 determines the particular type of circuit board 94 on the carriage 88 depending upon which switches 104, 106, 108 are actuated. The controller 120 then controls the wave soldering process in a preprogrammed way based upon the particular printed circuit board 94 being processed. Illustratively, switches 104, 106 and 108 correspond to three binary fields read by controller 120, thus corresponding to eight possible card configurations, as shown below:

| Switch 104 | Switch 106 | Switch 108 | Card Type |
| --- | --- | --- | --- |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

As one of ordinary skill in the art will readily appreciate, any number of switches and actuators may be used to correspond to more or fewer printed circuit board 94 types. As is also apparent to one or ordinary skill in the art, the switch mechanism need not be limited to electromechanical switches as illustrated in the exemplary embodiment. Illustratively, switches 104, 106 and 108, and actuators 112, 114, and 116 could be replaced with a bar code reader and bar strip, respectively, or magnetic sensors. Of course, numerous other devices readily apparent to one of ordinary skill in the art may be used to implement an identifying apparatus for carriage 88.

Controller 120 activates the flux station 62 and the nitrogen knife 63 as the carriage 88 moves over flux stations 62. Controller 120 also controls the IR heater 64 and controls the motor 70 to stop the carriage 88 over the heater 64. Therefore, the carriage 88 and the board 94 remain over the heater 64 in heating region 122 for a predetermined dwell time.

Different types of printed circuit boards require different lengths of time for preheating in order to optimize the soldering process. Therefore, the controller 120 stops the carriage 88 over the heater 64 for a different period of time based upon the type of board detected by switches 104, 106, and 108. After the preheating process is complete, controller 120 actuates the soldering station 66 and advances the carriage 88 through the soldering station 66. Illustratively, the soldering station 66 includes two separate solder pumps 121, 123 which control separate soldering stages.

Controller 120 selectively starts, stops and controls the progress of the carriage 88 over the flux station 62, nitrogen knife station 63, IR heater 64, and soldering station 66 by one of several methods. A first method is by moving the carriage 88 at a predefined speed so that the relative position of the carriage 88 is always known. Another method is by monitoring the progress of the carriage 88 by sensors placed along the rail 100 or near the flux station 62, nitrogen knife station 63, IR heater 64, and soldering station 66. In the disclosed exemplary embodiment, motor 70 is a stepper motor controlled by controller 120, and thus the carriage 88 progress correlates directly to the stepper motor input signal provided by controller 120.

Figure 6:
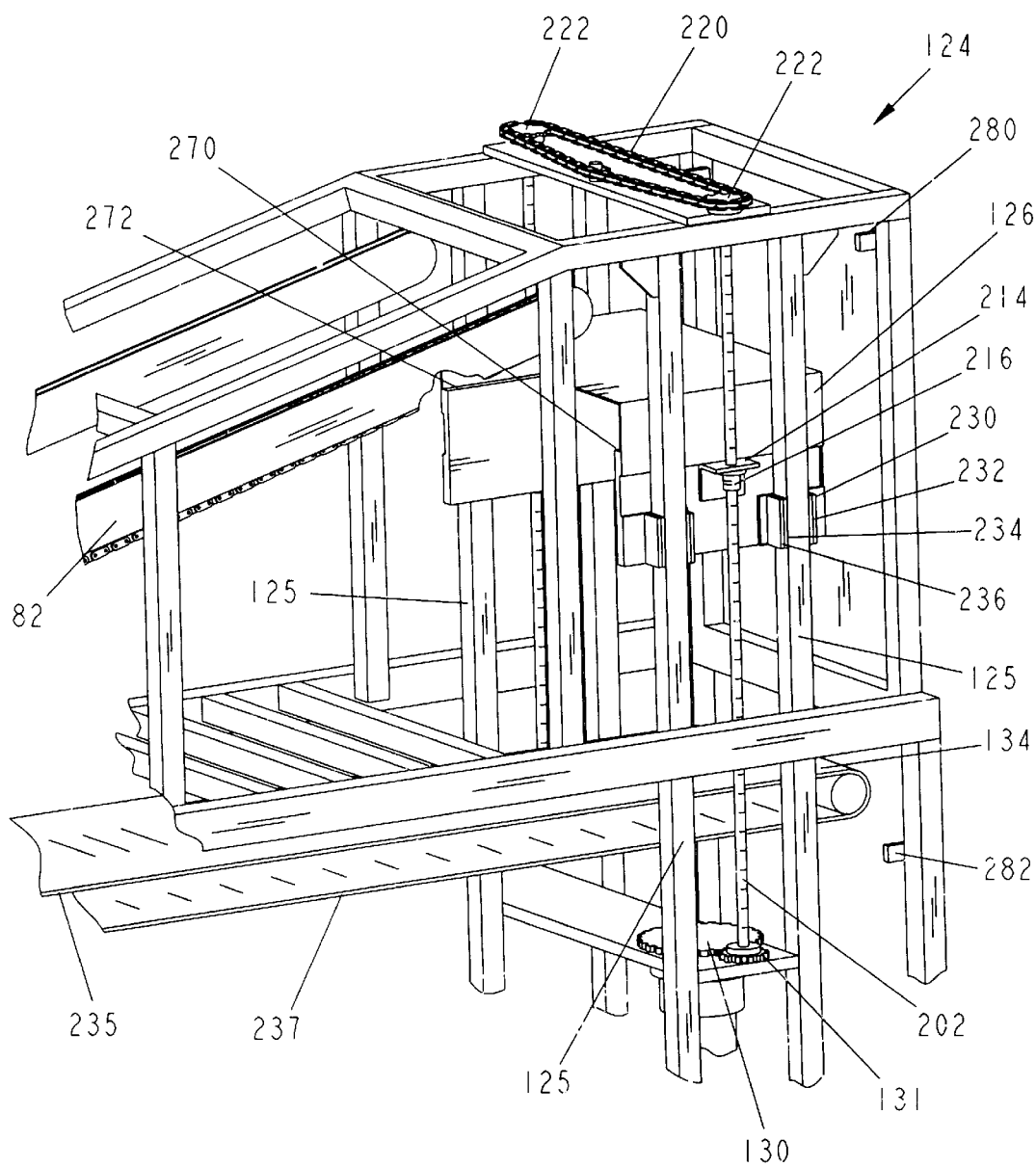
FIG. 6 is a detailed perspective view of an elevator for transporting the carriage from a first conveyor to a second conveyor.

A transport 127 transports carriage 88 from first conveyor 71 to second conveyor 134. In the exemplary embodiment described herein, the transport 127 is an elevator 124. Elevator 124 is located adjacent the solder station 66 and first conveyor 71. Elevator 124 includes support members 125 configured to support a movable platform 126. A motor 128 and drive gear 130 are provided to move the support 126 up and down in the direction of double-headed arrow 132. Support 126 is moved to an upper position shown in FIG. 3 so that the carriage 88 moves into the support 126 after passing through the soldering station 66. Motor 128 is then actuated to move the support downwardly toward a second conveyor 134. Support 126 is moved to a lower position below the level of the second conveyor 134 so that the carriage 88 rests on the second conveyor 134. Upper and lower limit switches 280 and 282 provide controller 120 with a signal when the support reaches its upper and lower positions, respectively, as shown in FIG. 6. A motor 136 is then operated to move the second conveyor 134 and transport the carriages 88 in the direction of arrow 138 shown in FIG. 3 back to an outlet location 140.

Figure 7:
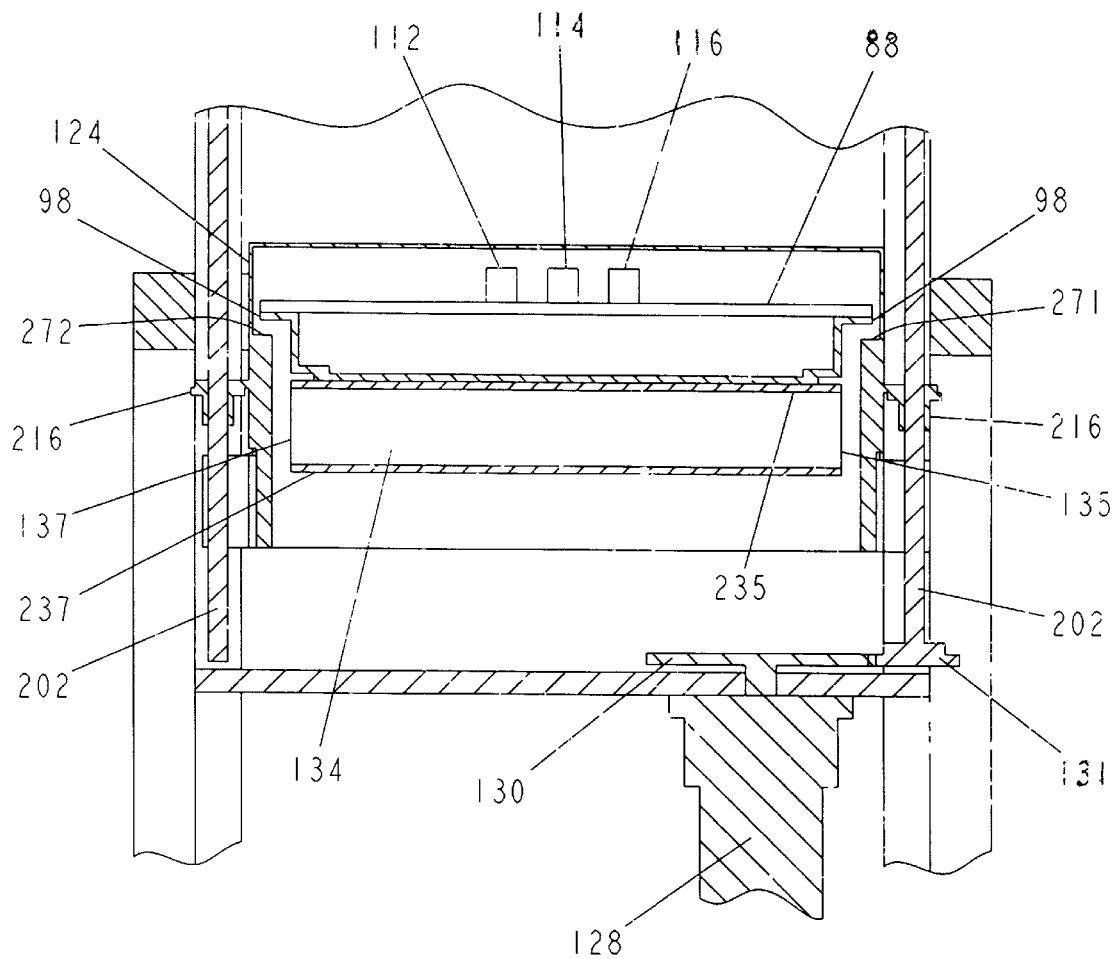
FIG. 7 is a cross section view of the elevator after transporting the carriage onto the second conveyor.

A more detailed view of the exemplary embodiment of the elevator 124 is provided in FIGS. 6 and 7. Platform 126 is slidably coupled to support members 125 by spaced apart brackets 230, 236 and bushings 232 and 234. On both sides of platform 126 are threaded rods 202. Platform 126 is coupled to threaded rod 202 via bracket 214 and threaded receiver 216. Drive gear 130 engages sprocket 131 on the bottom of one of the threaded rods 202. Upper sprockets 222 on the top of threaded rods 202 engage via chain 220 causing both threaded rods 202 to rotate. As threaded rods 202 rotate, threaded receivers 216 moves relative to the threaded rods 202, and the entire platform 126 slides along support members 125.

Carriage 88 is transferred from chain guard 82 and guide member 100 to support surfaces 270 and 272 located in the interior of platform 126. Support surfaces 270 and 272 are spaced to receive opposite side flanges 98 of carriage 88. Support surfaces 270 and 272 are also spaced apart to extend beyond side edges 135 and 137 of conveyor 134 as shown in FIG. 7. The cross section view of FIG. 7 also shows top surface 235 and bottom surface 237 of conveyor 134. As the platform 126 is lowered, conveyor 134 is received by platform 126, and, in turn, carriage 88 is received by top surface 235 of conveyor 134 and disengages support surfaces 270 and 272.

In operation, an operator loads the carriage 88 onto the inlet portion 118 of the wave solder apparatus 60 by inserting the pin 86 on the carriage 88 between links of the chain 72. Controller 120 activates motor 70 to rotate the chain 72 and move the carriage 88 in the direction of arrow 74. Controller 120 also controls the flux station 62, nitrogen knife 63, and the preheater 64.

Controller 120 detects inputs received by switches 104, 106 and 108 to determine the particular type of printed circuit board 94 in the carriage 88. The configuration of the actuators 112, 114, 116 is selected to engage selected switches 112, 114, 116 depending upon the particular type of circuit board 94 in the carriage 88. Illustratively, a different type of actuator configuration on the carriage 88 is provided for each different type of printed circuit board 94 to be processed. Switches 104, 106, and 108 are illustratively actuated by direct contact with arms 112, 114, and 116. It is understood that any type of sensor may be used in accordance with the present invention, including optical sensors, magnetic sensors, etc. Controller 120 uses the information related to the type of circuit board 94 to control the amount of time that the carriage 88 stops above heater 64, the chain 72 speed, and the pump 121 and pump 123 control signals. Therefore, the controller 120 controls these parameters for each circuit board 94 in a customized, optimum manner.

After the preheating step is complete, controller 120 actuates pumps 121 and 123 of solder station 66 and actuates motor 70 to continue moving the carriage 88 in the direction of arrow 74 through the soldering station 66. Illustratively, an enclosure 142 is provided to provide a nitrogen rich environment around the soldering station 66. After the carriage 88 is moved onto the support 126 of elevator 124, controller 120 activates motor 128 to move the carriage 88 downwardly onto conveyor 134. Finally, controller 120 activates motor 136 to move the carriage 88 in the direction of arrow 138 to the outlet location 140.

The inlet location 118 and the outlet location 140 are at substantially the same location so that the same operator can load and unload the carriages 88 from substantially the same location. The carriages 88 move linearly in a first direction and then linearly in an opposite direction to substantially the same point to facilitate operation of the wave solder apparatus 60 by a single operator.

After each printed circuit board 94 is soldered, the controller 120 increases a cycle count. When the cycle count equals 10, the controller resets the cycle count to 0 and activates a flux pump in flux station 62. Because flux in flux station 62 is used on each printed circuit board 94, the amount of flux will diminish over time. Activating a flux pump in flux station 62 every ten cycles ensures that an adequate amount of flux is available each time a printed circuit board 94 is moved over flux station 62.

Figure 8:
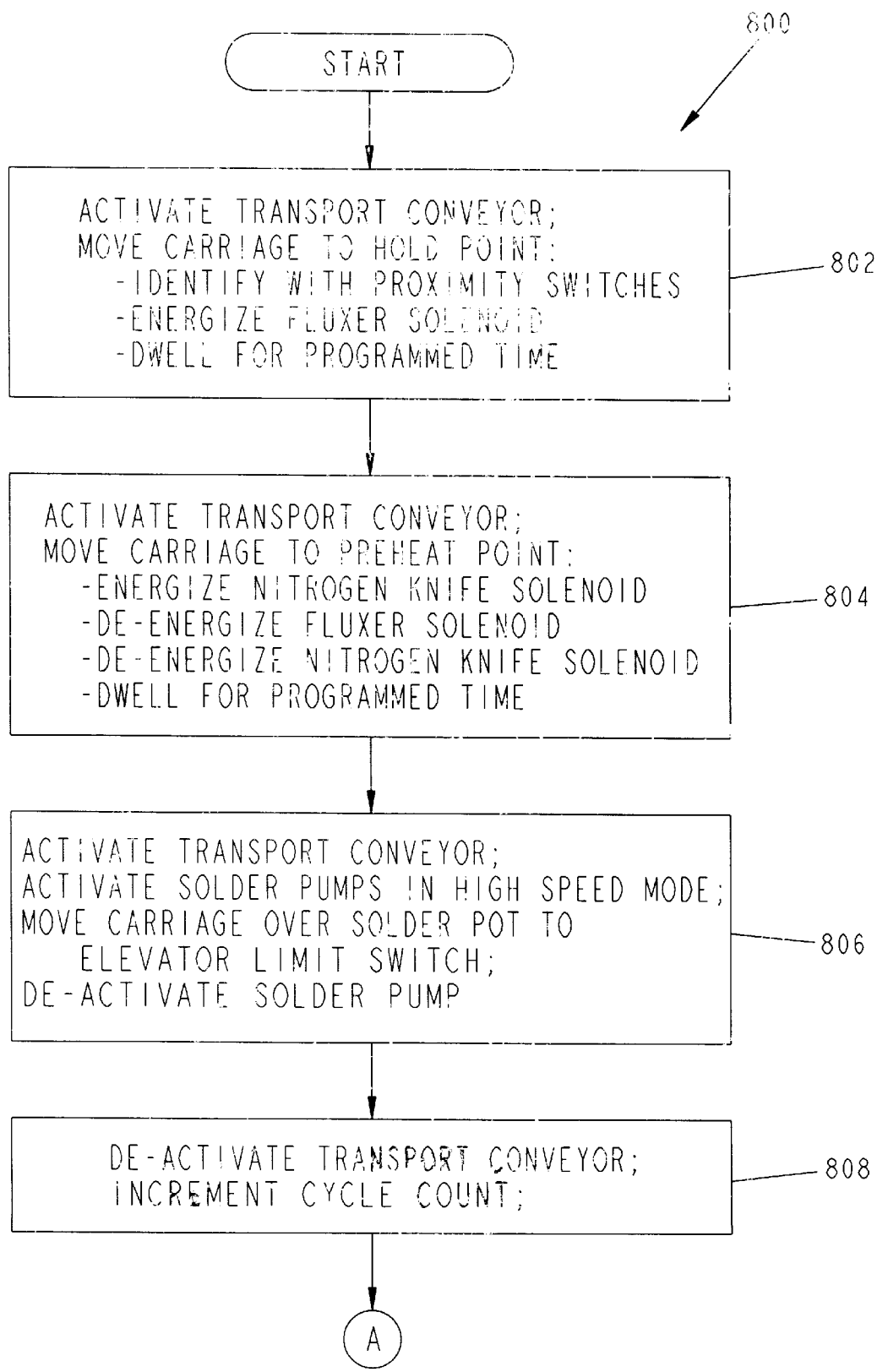
FIG. 8 is an illustrative flow chart of a first portion of a controller program used in a controller in the embodiment disclosed in FIGS. 3–7, the first portion of the controller program controlling the carriage movement over flux, preheat and soldering sections.
Figure 9:
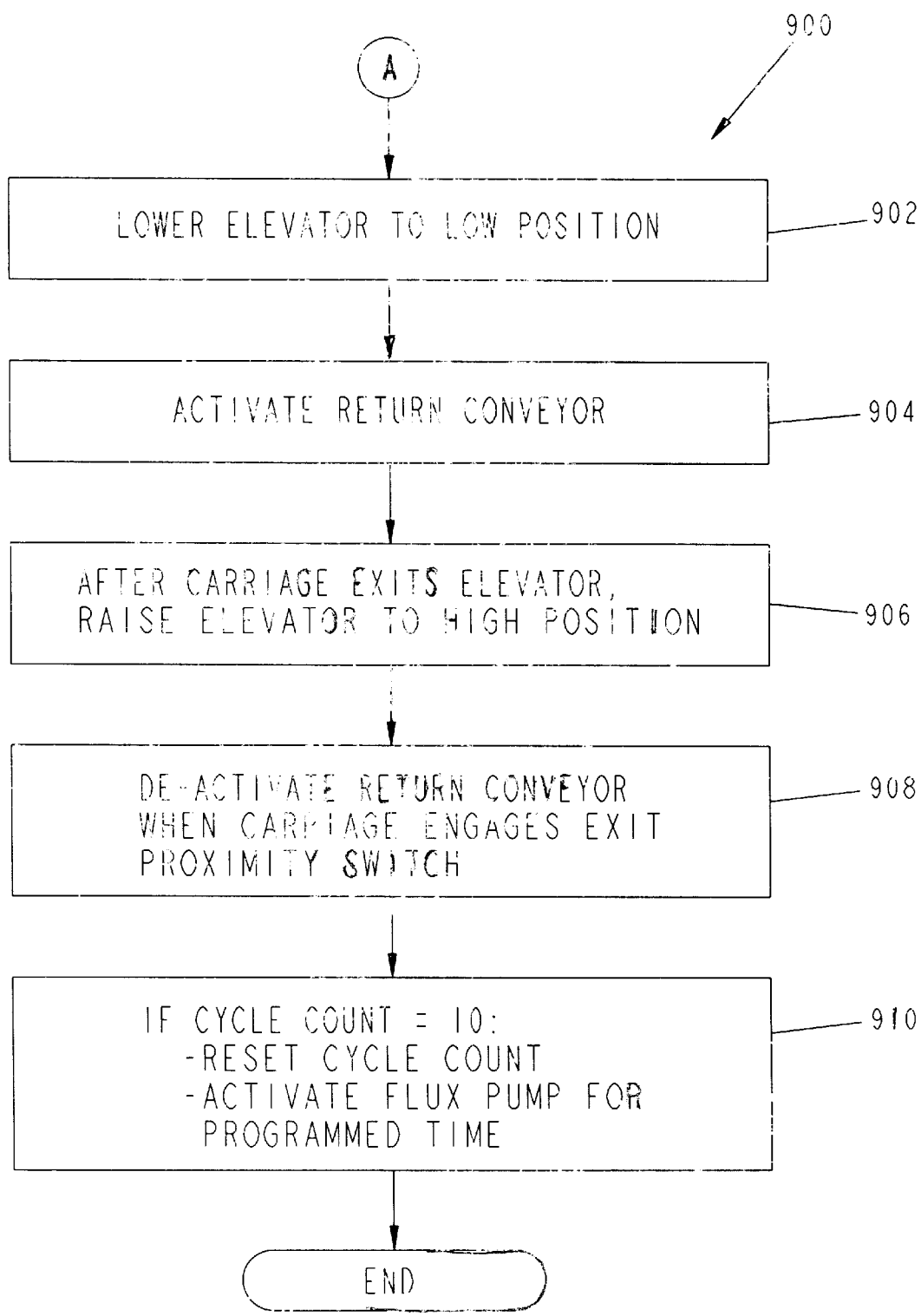
FIG. 9 is an illustrative flow chart of a second portion of the controller program, the second portion of the controller program controlling a return conveyor.

FIGS. 8 and 9 provide flow diagrams of the program used in controller 120 to control the illustrative embodiment. Flow diagram 800 of FIG. 8 illustrates the wave soldering control process. As shown in Block 802, the controller 120 activates a transport conveyor. In the illustrative embodiments, the transport conveyor includes chain guard 82 and chain 72. The carriage 88 is moved to the first hold point, where the carriage is identified with switches 104, 106, and 108 by actuators 112, 114, and 116. Once the controller 120 has identified the carriage, flux station 62 is energized for a programmed time. After the program time has expired, the transport conveyor is again activated as shown in Block 804. The carriage 88 is moved to a pre-heat point and held stationary over heater 64. During this transition, the nitrogen knife 63 is energized and the flux station 62 is de-energized. After the carriage has traversed the nitrogen knife 63, the nitrogen knife 63 is de-energized. The carriage 88 is then held stationary over heater 64 and dwelled for a programmed time.

After the programmed time has expired the transport conveyor is again activated as shown in Block 806. Solder pumps 120 and 123 are activated to create a solder wave, and the carriage 88 moves over the solder pot to accomplish the wave soldering step. The carriage continues to move after the soldering operation is complete and solder pumps 121 and 123 are deactivated. Carriage 88 is then deposited in elevator platform 126 and the transport conveyor is deactivated. A soldering cycle count is then incremented. At this time, another carriage 88 may be placed on the transport conveyor for soldering.

Operation of the elevator 124 and return conveyor 134 are controlled by a program corresponding to flow diagram 900 as shown in FIG. 9. Once the carriage 88 is received by elevator platform 126, platform 126 is lowered to the low position. When platform 126 achieves the low position, carriage 88 is fully received on second conveyor 134. In block 906, controller 120 monitors the carriage 88 to ensure that the carriage 88 has exited the elevator platform 126 before the elevator platform 126 is raised back to the high position. The carriage 88 is then returned to the user via return conveyor 134. Return conveyor 134 is deactivated once the carriage 88 engages an exit proximity switch, as shown in Block 908. Finally, the controller checks the cycle count. If the cycle count is equal to 10 the cycle count is reset, and a flux pump is activated for a programmed time.

Controller 120 also includes a fault monitoring program to monitor various fault signals including i) solder level low; ii) nitrogen level low; iii) elevator time out; iv) elevator location error; v) solder temperature High/Low; and vi) heater temperature. The fault monitoring program also prevents the solder pumps 121 and 123 from activating until the solder reaches a predefined temperature, and will prevent the initiation of a wave soldering operation until all temperature readings in the wave soldering apparatus are at the required values. Finally, the fault monitoring program immediately ceases all soldering operations if an operation inputs an emergency stop command to controller 120.

Illustratively, the drive motor 70 is a Model 2H457 Gearmotor available from W. W. Grainger, Inc. Illustratively, flux pump 62 is a Model 2P301 available from W. W. Grainger, Inc. Heater 64 is illustratively a 15 watts/square inch heater available from Couchman—Conant, Inc. Illustratively, solder station 66 is a Model M11D available from Wenesco, Inc. Illustratively, return conveyor 134 is a Model 4100-1006-01/04 conveyor available from Dorner Manufacturing Corp.

Although the invention has been described in detail with reference to certain exemplary embodiments, variations and modifications exist with the scope and spirit of the present invention as defined and described in the following claims.

What is claimed is:

1. A wave soldering apparatus comprising:
    a frame having a first end,
    wave solder equipment supported with respect to the frame, the wave solder equipment being configured to apply solder to a circuit board; and
    a circuit board transporter supported with respect to the frame, the circuit board transporter being configured to receive a circuit board adjacent the first end of the frame, to move the circuit board away from the first end of the frame and over the wave solder equipment which applies solder to the circuit board, and to return the circuit board for retrieval adjacent the first end of the frame.

2. The apparatus of claim 1, further comprising a controller, the controller coupled to the wave solder equipment and circuit board transporter, wherein the controller is configured to cooperatively operate the circuit board transporter and wave solder equipment to wave solder the printed circuit board.

3. The apparatus of claim 2, wherein the circuit board transporter includes:
    a carriage configured to receive and support a printed circuit board;
    a first conveyor configured to convey the carriage along a first conveyor path;
    a second conveyor configured to convey the carriage along a second conveyor path; and
    a transport configured to receive the carriage from the first conveyor and transport the carriage to the second conveyor.

4. The apparatus of claim 3, wherein the transport includes a platform, the platform movable between a first and second position, the platform adjacent the first conveyor in the first position, and adjacent the second conveyor in the second position.

5. The apparatus of claim 3, further including:
    an identifier attached to the carriage, the identifier configurable to identify the printed circuit board; and
    an identifier sensor configured to read the identifier attached to the carriage and provide an identifier signal.

6. The apparatus of claim 5, wherein the controller is further configured to store parameters corresponding to a plurality of printed circuit boards, and to receive the identifier signal from the identifier sensor and access the parameters corresponding to the identifier.

7. The apparatus of claim 6, wherein the wave soldering equipment includes a preheat station proximately spaced from the conveyor path, and the preheat station is configured to heat the printed circuit board, and wherein the controller is further configured hold the carriage over the preheat station for a programmed time.

8. The apparatus of claim 7 wherein the controller determines the programmed time based on the identifier.

9. The apparatus of claim 2, wherein the circuit board transporter includes a conveyor configured to receive and move a printed circuit board along a conveyor path.

10. The apparatus of claim 9, wherein the controller is coupled to the conveyor and the soldering equipment, the controller configured to activate the wave soldering equipment to apply solder to the printed circuit board when the printed circuit board traverses the wave soldering equipment in a first direction.

11. The apparatus of claim 10, wherein the controller is further configured to deactivate the wave soldering equipment after the printed circuit board has traversed the soldering station and move the conveyor in a second direction, the second direction opposite the first direction.

12. The apparatus of claim 11, wherein the wave soldering equipment includes a preheat station proximately spaced from the conveyor path, and the preheat station is configured to heat the printed circuit board, and wherein the controller is further configured hold the carriage over the preheat station for a programmed time.

13. The apparatus of claim 12 wherein the controller determines the programmed time based on an identifier.

14. A wave soldering apparatus, comprising:
    a carriage configured to receive and support a printed circuit board;
    a first conveyor configured to convey the carriage along a first conveyor path;
    a second conveyor configured to convey the carriage along a second conveyor path;
    a preheat station proximately spaced from the first conveyor path, the preheat station configured to heat the printed circuit board;
    a soldering station configured to form a solder wave, the soldering station proximately spaced from the first conveyor path and wherein the carriage supporting the printed circuit board traverses over the solder wave and the solder wave communicates solder onto the printed circuit board;
    a transport configured to receive the carriage from the first conveyor and transport the carriage to the second conveyor; and
    a controller coupled to the first conveyor, preheat station, soldering station, transport, and second conveyor, the controller configured to cooperatively operate the first conveyor, preheat station, soldering station, transport, and second conveyor to wave solder the printed circuit board.

15. The apparatus of claim 14, wherein the transport includes an elevator, the elevator adjacent to the first conveyor.

16. The apparatus of claim 15, wherein the elevator further includes a platform, the platform movable between a first and second position, the platform adjacent to the first conveyor in the first position, and adjacent the second conveyor in the second position.

17. The apparatus of claim 16, wherein the elevator further includes:
a first sensor coupled to the controller, the first sensor providing a first limit signal to the controller when the platform in is the first position; and
a second sensor coupled to the controller, the second sensor providing a second limit signal to the controller when the platform is in the second position.

18. The apparatus of claim 16, wherein the platform includes first and second support surfaces, and the first and second support surfaces are adjacent to the end of the first conveyor path when the platform is in the first position, and the first and second support surfaces receive the carriage from the first conveyor.

19. The apparatus of claim 18, wherein the first and second support surfaces are spaced apart to receive the second conveyor when the platform is in the second position.

20. The apparatus of claim 19, wherein the carriage moves from a loading area linearly in a first direction on the first conveyor path and linearly in an opposite direction on the second conveyor path to a discharge area, and the discharge area is adjacent the loading area.

21. The apparatus of claim 14, further including:
an identifier attached to the carriage, the identifier configurable to identify the printed circuit board; and
an identifier sensor configured to read the identifier attached to the carriage and provide an identifier signal.

22. The apparatus of claim 21, wherein the controller is further configured to store parameters corresponding to a plurality of printed circuit boards, and further configured to receive the identifier signal from the identifier sensor and access the parameters corresponding to the identifier.

23. The apparatus of claim 22, wherein:
the identifier includes a plurality of proximately spaced actuators, the actuators removably mounted onto the carriage; and
the identifier sensor includes a plurality of proximately spaced switches, each switch corresponding to an actuator, the switches providing an identifier signal.

24. The apparatus of claim 22, wherein
the identifier includes a bar code marking on the carriage; and
the identifier sensor includes a bar code reader, the bar code reader proximately spaced from the carriage to read the bar code marking to provide an identifier signal.

25. The apparatus of claim 22, where in the first conveyor includes:
a first guide member having a surface defining a longitudinal opening;
a drive below the longitudinal opening; and
a second guide member.

26. The apparatus of claim 25, wherein the carriage includes:
a first flanged surface, the first flanged surface engaging the surface of first guide member;
a pin attached to the bottom of the first flanged surface, the pin penetrating the longitudinal opening and engaging the drive; and
a second flanged surface, the second flanged surface engaging the second guide member.

27. The apparatus of claim 26, wherein the drive includes:
a drive motor;
a first sprocket coupled to the drive motor;
a second sprocket; and
a chain coupled to the first and second sprockets.

28. The apparatus of claim 22, wherein the transport includes an elevator, the elevator adjacent to the first conveyor.

29. The apparatus of claim 28, wherein the elevator further includes a platform, the platform movable between a first and second position, the platform adjacent to the first conveyor in the first position, and adjacent the second conveyor in the second position.

30. The apparatus of claim 29, wherein the platform includes first and second support surfaces, and the first and second support surfaces are adjacent to the end of the first conveyor path when the platform is in the first position, and the first and second support surfaces receive the carriage from the first conveyor.

31. The apparatus of claim 30, wherein the first and second support surfaces are spaced apart to receive the second conveyor when the platform is in the second position.

32. The apparatus of claim 22, further including a first conveyor sensor coupled to the controller, the first conveyor sensor providing a conveyor signal, the controller further configured to correlate the conveyor signal to the carriage position along the first conveyor path.

33. The apparatus of claim 32, wherein the controller is further configured hold the carriage over the preheat station for a programmed time based on the identifier.

34. The apparatus of claim 14, wherein the carriage moves from a loading area linearly in a first direction on the first conveyor path and linearly in an opposite direction on the second conveyor path to a discharge area, and the discharge area is adjacent the loading area.

35. A wave soldering apparatus, comprising:
a conveyor configured to receive and move a printed circuit board along a conveyor path;
a soldering station configured to form a solder wave, the soldering station proximately spaced from the conveyor path wherein the printed circuit board traverses the solder wave and the solder wave applies solder to the printed circuit board; and
a controller coupled to the conveyor and the soldering station, the controller configured to cooperatively operate the conveyor and soldering station wherein the soldering station is activated and forms a solder wave when the printed circuit board traverses the soldering station in a first direction, and the soldering station is deactivated when the printed circuit board is moved in a second direction, the second direction opposite the first direction.

36. The apparatus of claim 35, further comprising a preheat station proximately spaced from the conveyor path wherein the preheat station heats the printed circuit board and wherein the controller is further configured hold the carriage over the preheat station for a programmed time.

37. The apparatus of claim 36 wherein the controller determines the programmed time based on an identifier.

* * * * *